US012764206B2

(12) United States Patent
Mecham et al.

(10) Patent No.: US 12,764,206 B2
(45) Date of Patent: Oct. 13, 2026

(54) OBSERVING SIGNALS IN A NETWORK AND/OR IDENTIFYING SIGNALING PROTOCOLS AND RELATED DEVICES, SYSTEMS, AND METHODS

(71) Applicant: Battelle Energy Alliance, LLC, Idaho Falls, ID (US)

(72) Inventors: Keith D. Mecham, Rigby, ID (US); Ted R. Tracy, Idaho Falls, ID (US); Tanmay S. Bhagwat, Leesburg, VA (US); Daniel P. Hearn, Ammon, ID (US); Devin J. Vollmer, Chubbuck, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 213 days.

(21) Appl. No.: 18/710,451

(22) PCT Filed: Nov. 8, 2022

(86) PCT No.: PCT/US2022/079495
§ 371 (c)(1),
(2) Date: May 15, 2024

(87) PCT Pub. No.: WO2023/091867
PCT Pub. Date: May 25, 2023

(65) Prior Publication Data

US 2025/0016252 A1 Jan. 9, 2025

Related U.S. Application Data

(60) Provisional application No. 63/264,187, filed on Nov. 17, 2021.

(51) Int. Cl.
*H04L 69/22* (2022.01)
*H04L 69/04* (2022.01)

(52) U.S. Cl.
CPC .............. *H04L 69/22* (2013.01); *H04L 69/04* (2013.01)

(58) Field of Classification Search
CPC ....... H04L 69/22; H04L 69/04; H04L 67/125; H04L 69/08; H04L 69/321; H04L 69/324; H04L 69/325; H04L 63/1408
See application file for complete search history.

(56) References Cited

U.S. PATENT DOCUMENTS 5,940,598 A * 8/1999 Strauss .................. H04L 67/02 370/352
6,324,602 B1 * 11/2001 Chen ...................... H03M 7/30 710/68

(Continued)

FOREIGN PATENT DOCUMENTS

CN 105245555 B 4/2018
EP 1568188 B1 8/2010

(Continued)

OTHER PUBLICATIONS

International Search Report for International Application No. PCT/US2022/079495, mailed Feb. 16, 2023, 5 pages.

(Continued)

*Primary Examiner* — Lam T Mai
(74) *Attorney, Agent, or Firm* — TraskBritt

(57) ABSTRACT

A high-impedance input configured to observe a signal without disrupting the signal, an analog-to-digital converter configured to digitize the signal, and a memory configured to store the digital signal are disclosed herein. Also disclosed is a method of comparing a signal to one or more signal signatures to identify a signaling protocol of the signal and decoding the signal into a stream of values based on the signaling protocol. Some embodiments disclose a method of additionally comparing the stream of values to one or more communication signatures to identify a communication pro- (Continued)

tocol of the stream of values and decoding the stream of values into a message based on the communication protocol. Related devices, systems and methods are also disclosed.

30 Claims, 6 Drawing Sheets

(56) References Cited

U.S. PATENT DOCUMENTS

| | | | | |
|---|---|---|---|---|
| 6,556,028 | B1 * | 4/2003 | Umanskiy | G01R 29/22 324/727 |
| 8,074,097 | B2 * | 12/2011 | Beddoe | G06F 11/30 714/39 |
| 8,316,447 | B2 * | 11/2012 | Guruswamy | G06F 21/577 726/25 |
| 8,631,499 | B2 * | 1/2014 | Guruswamy | G06F 21/577 709/224 |
| 8,634,501 | B2 * | 1/2014 | Gaikwad | H04L 27/0002 455/66.1 |
| 9,161,249 | B1 * | 10/2015 | Leita | H04L 63/168 |
| 9,954,903 | B2 | 4/2018 | Taylor | |
| 10,038,763 | B2 * | 7/2018 | Hogoboom | H04L 69/22 |
| 10,042,354 | B2 | 8/2018 | Chand et al. | |
| 10,205,938 | B2 | 2/2019 | Regev et al. | |
| 10,404,265 | B1 * | 9/2019 | Farley | H03M 1/802 |
| 10,693,906 | B2 | 6/2020 | Al Abdulhadi et al. | |
| 11,012,330 | B2 | 5/2021 | Zambon | |
| 11,012,538 | B2 | 5/2021 | Edgar et al. | |
| 11,194,901 | B2 * | 12/2021 | El-Moussa | H04L 41/142 |
| 11,431,746 | B1 * | 8/2022 | Shaw | H04L 61/00 |
| 11,528,292 | B1 * | 12/2022 | Thanos | H04L 63/145 |
| 11,616,759 | B2 * | 3/2023 | Jiang | H04L 47/2441 709/224 |
| 11,994,542 | B2 * | 5/2024 | Kapoor | G01R 19/2509 |
| 2004/0075748 | A1 * | 4/2004 | Andrew Rogers | H04N 23/84 348/E5.079 |
| 2004/0083299 | A1 * | 4/2004 | Dietz | G06F 16/90344 709/224 |
| 2005/0108393 | A1 * | 5/2005 | Banerjee | H04L 63/1408 709/225 |
| 2007/0067458 | A1 | 3/2007 | Chand | |
| 2007/0150574 | A1 * | 6/2007 | Mallal | H04L 63/1408 709/223 |
| 2007/0186011 | A1 | 8/2007 | Batke et al. | |
| 2007/0209439 | A1 * | 9/2007 | Helms | G01V 3/15 73/579 |
| 2008/0307524 | A1 * | 12/2008 | Singh | H04L 63/1416 726/22 |
| 2009/0018458 | A1 * | 1/2009 | Cao | A61B 5/307 600/509 |
| 2010/0287613 | A1 * | 11/2010 | Singh | H04L 63/166 726/22 |
| 2011/0271348 | A1 * | 11/2011 | Guruswamy | H04L 63/1433 726/25 |
| 2012/0158975 | A1 * | 6/2012 | Hogoboom | H04L 69/22 709/228 |
| 2012/0238229 | A1 * | 9/2012 | Gaikwad | H04L 7/046 455/226.1 |
| 2012/0262122 | A1 * | 10/2012 | Sato | G01R 19/0092 320/128 |
| 2012/0323409 | A1 * | 12/2012 | Wellbrook | G06F 13/4072 341/110 |
| 2012/0331556 | A1 * | 12/2012 | Alperovitch | H04L 63/0227 726/23 |
| 2014/0133609 | A1 * | 5/2014 | Gaikwad | H04L 7/046 375/343 |
| 2014/0160603 | A1 * | 6/2014 | Parker | H02H 3/05 361/115 |
| 2014/0359708 | A1 * | 12/2014 | Schwartz | G06F 21/567 726/4 |
| 2015/0207812 | A1 * | 7/2015 | Back | H04L 63/1408 726/23 |
| 2015/0236937 | A1 | 8/2015 | Mies et al. | |
| 2016/0065610 | A1 * | 3/2016 | Peteroy | H04L 63/1441 713/153 |
| 2016/0134650 | A1 * | 5/2016 | Farmer | H04L 63/1433 726/23 |
| 2016/0178422 | A1 * | 6/2016 | Humpal | A01M 7/006 239/71 |
| 2016/0337359 | A1 | 11/2016 | Hojsik et al. | |
| 2016/0373483 | A1 * | 12/2016 | Schwartz | H04L 63/1491 |
| 2017/0324606 | A1 | 11/2017 | Hobbs | |
| 2018/0267639 | A1 * | 9/2018 | Han | G06F 3/0418 |
| 2018/0328964 | A1 * | 11/2018 | Mende | G01R 15/242 |
| 2019/0182368 | A1 | 6/2019 | Tang | |
| 2019/0245552 | A1 * | 8/2019 | Pachchigar | H03M 1/1205 |
| 2019/0253444 | A1 | 8/2019 | Yu et al. | |
| 2019/0349356 | A1 * | 11/2019 | McElwee | G06F 21/552 |
| 2019/0384951 | A1 * | 12/2019 | Stiglic | H04L 27/20 |
| 2020/0045023 | A1 | 2/2020 | Yu et al. | |
| 2020/0089385 | A1 * | 3/2020 | Han | G06F 3/04166 |
| 2020/0296121 | A1 * | 9/2020 | El-Moussa | H04L 63/1416 |
| 2021/0099424 | A1 | 4/2021 | Li et al. | |
| 2021/0302478 | A1 * | 9/2021 | Kapoor | G01R 19/2509 |

FOREIGN PATENT DOCUMENTS

| | | | |
|---|---|---|---|
| EP | 2315095 | B1 | 6/2017 |
| EP | 3584948 | A1 | 12/2019 |
| WO | 2019/245824 | A1 | 12/2019 |

OTHER PUBLICATIONS

International Written Opinion for International Application No. PCT/US2022/079495, mailed Feb. 16, 2023, 8 pages.

* cited by examiner

OBSERVING SIGNALS IN A NETWORK AND/OR IDENTIFYING SIGNALING PROTOCOLS AND RELATED DEVICES, SYSTEMS, AND METHODS

CROSS-REFERENCE TO RELATED APPLICATIONS

This application is a national phase entry under 35 U.S.C. § 371 of International Patent Application PCT/US2022/079495, filed Nov. 8, 2022, designating the United States of America and published as International Patent Publication WO 2023/091867 A1 on May 25, 2023, which claims the benefit under Article 8 of the Patent Cooperation Treaty of U.S. Provisional Patent Application Ser. No. 63/264,187, filed Nov. 17, 2021, titled "OBSERVING SIGNALS IN A NETWORK AND/OR IDENTIFYING SIGNALING PROTOCOLS AND RELATED DEVICES, SYSTEMS, AND METHODS," the disclosure of each of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

This description relates, generally, to observing signals. More specifically, some embodiments relate to observing signals in a network and to related methods, devices, and systems.

BACKGROUND

Cybersecurity efforts for critical infrastructure (CI) tend to focus on three physical technology networks, with each providing specific functions and presenting specific cybersecurity challenges. For example, an information technology (IT) network may host business management software, maintain financial records, enable commerce over the internet, and store intellectual property, among other things. Advanced cybersecurity tools for IT networks are plentiful and provide network monitoring, access control, analytic tools such as Intrusion Detection Systems (IDS) and even specific defensive tools for endpoints like personal computers (PCs) and servers. Next, an Operational Technology (OT) network may serve computerized numerical control (CNC) equipment, control center terminals, engineering workstations, supervisory control and data acquisition (SCADA) systems, and historians, among other things. OT networks focus on operations such as electrical grid management, are generally more restricted from external access, and can utilize most of the cybersecurity tools found in IT networks. Finally, an industrial control systems (ICS) network, which may be part of an OT network, contains the embedded systems responsible for process and equipment control, among other things. Example ICS devices include Human Machine Interfaces (HMI), Programmable Logic Controllers (PLC), and Remote Terminal Units (RTU). ICS networks may be isolated from external and internet access because of their critical importance to production, reliability, and safety.

Capability gaps leave ICS networks vulnerable to sophisticated cyber-attacks while IT and OT networks may be better protected. Few tools exist to protect ICS networks and the capability to detect malicious network activity is limited in comparison with IT and OT networks. IT and OT cybersecurity tools are incompatible with most ICS network communication and IT endpoint tools are incompatible with ICS devices at an architectural level. Conventional ICS networks rely on a cybersecurity strategy focused on isolation, segmentation, and layers of protection often described as "Defense in Depth" because there is simply no other option currently. This strategy (akin to putting ICS equipment in an underground bunker) is significantly better than leaving ICS exposed, unguarded, or unknowingly connected to the internet. However, several difficulties exist with this approach, and working around the difficulties can create new ingress points for attackers. For instance, it is common for ICS networks to be maintained and administrated by third parties requiring remote access (generally implemented through Virtual Private Network connections) to patch vulnerabilities, adapt programs to physical process changes, and to diagnose malfunctions. This circumvents layers of isolation and, to continue the bunker analogy, is equivalent to digging a tunnel down to the bunker and installing a back door. Even if the door is locked, opportunity for an attacker to find a way in is increased.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
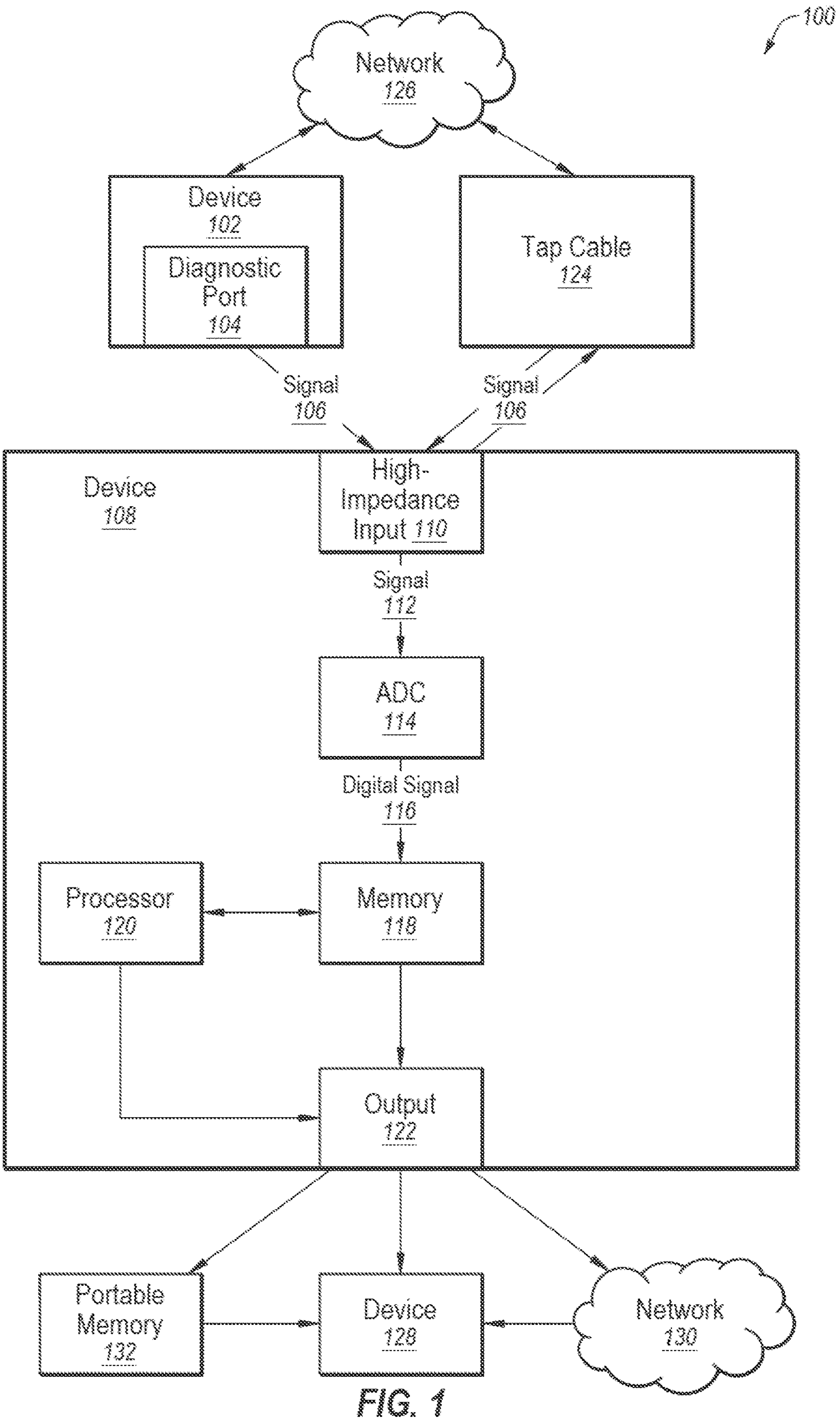
FIG. 1 is a functional block diagram illustrating an example environment in which one or more embodiments may be configured to operate.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment of this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Some embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

ICS networks may be vulnerable to attackers. For example, without ICS-network monitoring and analysis tools, chances of detecting infiltration into an ICS network early is low and symptoms of attack may only become apparent after it is too late to prevent disruption.

Communication in the ICS space is comprised of many disparate protocols, which creates difficult technical challenges such as incompatibility, and is an obstacle to the development of ICS cybersecurity tools. Investigating the differences between communication in IT, OT, and ICS networks reveal the complex factors of this problem and are relevant to understanding embodiments of this disclosure.

Core IT and OT communications are based on the IEEE 802.3 Ethernet protocol, yielding standardized networks where compatibility transcends diverse equipment manufacturers, physical media, and even successive generations of technology. In contrast, this standardization does not exist in the world of ICS networks. The communication protocols used in a given ICS installation vary widely based on equipment manufacturer, when the system was installed, and even the preferences of the integrator who designed the installation.

Until the mid-2000s, ICS networks were primarily based on various "serial" communication protocols. More than twenty distinct protocols are common in high-level ICS devices such as human-machine interfaces (HMIs) and programmable logic controllers (PLCs), plus at least eight other protocols are used for intelligent sensors, input/output expansion modules, and variable frequency drives. These protocols were not designed to be compatible and differ significantly in message structure, electrical signals, and even physical media type. Newer Ethernet based ICS communication protocols have done little to improve compatibility of ICS networks. Even though the twelve most common ICS Ethernet protocols are electrically compatible and use standard network/transport layers to transfer non-critical information, the data payload of these packets vary from one protocol to the next. Even more problematic, most of these protocols bypass Internet Protocol (IP) layers entirely and employ a modified Media Access Control (MAC) layer for deterministic or "real-time" communication including sensor input/output (I/O), motion control, and critical commands. These "real-time," low-level packets can coexist with standard IP packets on Ethernet media but may not be properly routed or understood by IT and OT network switches, firewalls, and endpoints. Communication across the ICS space is highly fragmented and no single, common protocol is supported between the various device manufacturers, thus development of tools for ICS becomes exceedingly complex.

Embodiments disclosed herein include methods, devices, and/or systems for observing communication in an ICS. Some embodiments may allow for performing security analysis of the communication of the ICS.

Some embodiments include methods, devices, and/or systems that overcome the technical challenges inherent to ICS communication to capture electrical signals from networks of any communication protocol, identify content encoded by the signals, translate the content into a universal format, and retransmit the content over a standard IT protocol such as transmission control protocol/internet protocol (TCP/IP).

In some embodiments, example operations include: obtaining signal signatures for the electrical layers of communication protocols; obtaining communication signatures for the data layers of communication protocols; observing/capturing a signal (e.g., a signal encoding communication); identifying an electrical layer of the observed signal by comparing the observed signal to the signal signatures; identifying a data layer of the observed signal by comparing the observed signal to the communication signatures; and translating the communication (encoded by the signal) to another format, e.g., for forwarding to another device, e.g., a cybersecurity device for security analysis.

In some embodiments, example observe/capture operations include: passively tapping a target device or network by connecting a capture device in line with an existing communication path. Passively tapping a target network may include physical connection to the communication media, such as through a coaxial cable, or a CAT6 ethernet cable, etc., in order to monitor the electrical signals without introduction of interference or alteration. In some embodiments, tapping may include disconnecting a cable from the target device, then plugging the cable into a first port of the capture device and connecting a second port of the capture device to the now empty port of the target device. This may be considered "passive" because the capture device does not electrically affect the target signal and cannot alter or transmit any communication. In some embodiments, tapping may include connecting the capture device to a port, e.g., a diagnostic port of a target device. In some embodiments, the capture device may include a variety of adapter cables, e.g., suitable to connect to a variety of ports to enable connection to various different networks. In some embodiments, example observe/capture operations include using an analog-to-digital converter (ADC) and a field-programmable gate array (FPGA) to passively capture communication signals.

FIG. 1 is a functional block diagram illustrating an example environment 100 in which one or more embodiments may be configured to operate. In particular, environment 100 includes a device 102 (which may, for example, be a device configured to operate in a network 126 (which network 126 may be an ICS network)) and a device 108. Device 102 may be configured to communicate with one or more other devices in network 126. Device 108 may be generally configured to observe communication in network 126. For example, device 108 may observe communications of (e.g., to and from) device 102. Further, in some embodiments, device 108 may be configured to translate observed communication (e.g., communication according to an ICS protocol) into another protocol (e.g., a standard protocol).

Device 102 may be any device capable of communication in network 126 (which network 126 may be an ICS network). Examples of device 102 include a remote terminal unit (RTU), a master terminal unit (MTU), a programmable logic controller (PLC), a programmable automation controller (PAC), a human-machine interface (HMI), an embedded controller, a process controller, a motor controller, a variable frequency drive (VFD), an intelligent switchgear, an intelligent field device (sensor or actuator), and an engineering workstation.

Device 102 may be configured to communicate according to a signaling protocol. A signaling protocol may describe and/or define characteristics of signals usable for communication. The signaling protocol may define how a signal (e.g., voltages of the signal) is translatable into values. Examples of characteristics include: a peak-to-peak voltage range, a count of voltage levels, voltages of voltage levels, a count of transitions between voltage levels, transition times, an idle-state voltage, a type of signal (e.g., whether the signal is of a differential type or a single-ended type), a number of channels carrying the signal, and a timing synchronization between channels (e.g., the number of channels carrying the signal). Examples of signaling protocols include EIA/RS-232, EIA/RS-485, Ethernet (IEEE 802.3 physical layer), CAN, ControlNet, CompoNet, CCLink, DataHighway, Modbus Plus, and ARCNET.

Additionally, device 102 may be configured to communicate according to a communication protocol. A communication protocol may describe and/or define how values of the signal may be interpretable as a message, e.g., a communication protocol may define rules, syntax, semantics, and/or synchronization of communications. For example, a communication protocol may describe and/or define message characteristics such as header sizes, header content, a data format, payload sizes, function codes, error-check codes, priority information, etc. Examples of communication protocols include DNP3, TCP/IP, UDP, Profinet, Profibus, EtherNet/IP, MMS, GOOSE, CANopen, DeviceNet, BACnet, LonWorks, BSAP, ControlNet, Modbus RTU, Modbus TCP, EtherCAT, POWRLINK, and Foundation Fieldbus H1/HSE.

Device 102 may include a diagnostic port 104. In some embodiments, diagnostic port 104 may provide for access to communication on network 126 and/or bus, e.g., by repeating signals received from network 126, sent to network 126, and/or on the bus.

Tap cable 124 may provide for access to communication on network 126 and/or the bus. For example, tap cable 124 may provide a means of connecting device 108 to network 126 and/or the bus. In some embodiments, tap cable 124 may be, or may include a connection (e.g., an intercept point) between device 108 and network 126. At tap cable 124, instead of a signal flowing between device 102 and another device of network 126, the signal may be routed by tap cable 124, to high-impedance input 110 of device 108, at high-impedance input 110, the signal may be routed back through the other side of tap cable 124, where it resumes its path to the other device of network 126. Additionally or alternatively, in some embodiments, device 108 may be connected to network 126 and/or the bus between device 102 and another device on network 126 or the bus.

Device 108 may receive signal 106 from device 102 via diagnostic port 104. Additionally or alternatively, device 108 may receive signal 106 from tap cable 124. Additionally or alternatively, in some embodiments, device 108 may be directly connected to network 126 or the bus and may directly receive signal 106. Signal 106 may be, or may include, signals being transmitted and/or received by device 102, e.g., via network 126, of which device 102 may be a part.

At high-impedance input 110, device 108 may observe signal 106 without disrupting signaling of device 102 (e.g., signals being transmitted to and/or received from device 102) and/or signaling of network 126. For example, in cases which high-impedance input 110 receives signal 106 from diagnostic port 104, signal 106 from diagnostic port 104 may be a copy of a signal received by, or transmitted by, device 102 and thus may not disrupt reception or transmission of signals by device 102. In cases in which high-impedance input 110 receives signal 106 from tap cable 124, signal 106 may be observed at high-impedance input 110 without being substantially altered, and signal 106 may be routed back to tap cable 124 substantially unaltered.

High-impedance input 110 may exhibit a high isolation, e.g., greater than 1 kilovolt of isolation. Additionally or alternatively, high-impedance input 110 may exhibit a high impedance, e.g., greater than about 10 kiloohms. Thus, at high-impedance input 110, device 108 may observe signal 106 without altering voltage of signals being transmitted to and/or received from device 102 by more than 10%, for example. In some embodiments, device 108, via high-impedance input 110, may observe signal 106 while altering voltages of the signals by less than 2%, for example.

Additionally or alternatively, high-impedance input 110 may be considered to have a "floating reference." For example, high-impedance input 110 may adapt automatically to match the ground potential of signal 106. Thus, if a large voltage differential exists between the voltage of signal 106, as received from network 126, and a reference voltage of device 108, high-impedance input 110 may adapt and allow signal 106 to be observed. Without the "floating reference" signal 106 may shift outside the useful input range of an analog-to-digital converter 114 (ADC 114) as the voltage difference between network 126 and device 108 changes.

In some embodiments, diagnostic port 104 may include multiple ports. For example, diagnostic port 104 may include two ports, e.g., one for allowing observation of signals transmitted by device 102, and another allowing observation of signals received by device 102. In such a case, high-impedance input 110 may include two high-impedance ports, e.g., one for observing signal 106, e.g., a copy of a signal received by device 102 and another for observing a copy of a signal transmitted by device 102. Additionally or alternatively, diagnostic port 104 may include multiple ports, each for providing copies of signals transmitted by and received by device 102. High-impedance input 110 may include multiple corresponding high-impedance ports for observing the signals.

In some embodiments, signals being transmitted to and/or received from device 102 may be configured as a differential signal. Accordingly, high-impedance input 110 may include two paired high-impedance inputs configured to receive the differential signal.

Additionally or alternatively, in some embodiments, signals being transmitted to and/or received from device 102 may be arranged in a number of channels (e.g., different lines). Accordingly, high-impedance input 110 may include a number of high-impedance inputs 110 configured to receive the signal according to the number of channels. For example, device 108 may include one, two, four, eight, or more independent high-impedance inputs 110 and/or corresponding ADCs 114 to receive signal 106 according to the channels of signal 106.

High-impedance input 110 may provide signal 112 (e.g., signal 106 as observed at high-impedance input 110) to ADC 114. Signal 106 and signal 112 may be considered digital signals, e.g., including discrete voltage values capable of being decoded into a communication, e.g., as encoded by communicating devices of network 126. Additionally, signal 106 and signal 112 may be considered analog signals to be sampled at ADC 114. ADC 114 may convert signal 112 (which may be considered an analog signal or a digital signal observed at high-impedance input 110) into digital signal 116 (which may be a digitized version of signal 112). ADC 114 may be configured to digitize signal 112 at a rate that is at least twice as fast as a data rate of signal 112. ADC 114 may provide digital signal 116 to memory 118.

Memory 118 may be configured to store digital signal 116. Additionally, memory 118 may store one or more signal signatures relating to one or more corresponding signaling protocols. Each of the signaling signatures may exhibit and/or include the characteristics of its corresponding signaling protocol. Additionally, memory 118 may store one or more communication signatures relating to one or more corresponding communication protocols. Each of the communication signatures may exhibit and/or include the characteristics of its corresponding communication protocol. Additionally, memory 118 may store translated data, and/or any "derivative data" (including, e.g., analytic results, logs, or summaries) e.g., prior to providing such translated and/or derivative data at output 122.

A processor 120 may be configured to analyze digital signal 116 as stored in memory 118. Processor 120 may be, or may include, one or more processors and/or FPGA logic implemented in one or more FPGAs. In some embodiments, processor 120 may be configured to analyze digital signal 116 in real time, e.g., while digital signal 116 is being stored in memory 118. For example, an incoming portion of digital signal 116 may be stored in a buffer while a portion of digital signal 116 in the buffer is being analyzed.

In some embodiments, processor 120 may be configured to decode a message of digital signal 116, encode the message according to another (e.g., a standard) communication protocol and/or signaling protocol, and provide the encoded message at an output 122.

In some embodiments, the process of decoding the message of digital signal 116 may include comparing the observed signal (e.g., digital signal 116) with one or more of the one or more signal signatures. The comparing of the observed signal with the signal signatures may be to identify the signaling protocol of the observed signal (e.g., digital signal 116). For example, digital signal 116 may be compared with one or more of the signal signatures to determine a match (or closest match). The match (or closest match) may be an indication that digital signal 116 is of the signaling protocol of the matching signal signature. Additionally or alternatively, processor 120 may determine whether signal 106 requires special handling, e.g., whether signal 106 needs to be routed to the regeneration tap circuit.

Once the signaling protocol has been identified, digital signal 116 may be decoded into a string of values, e.g., the string of values encoded by signal 106. The string of values may be compared with one or more communication signatures. The comparing of the string of values with the communication signatures may be to identify the communication protocol of the observed signal (e.g., digital signal 116). For example, the string of values may be compared with one or more of the communication signatures to determine a match (or closest match). The match (or closest match) may be an indication that the string of values encodes a message according to the communication protocol of the matching communication signature.

Once the communication protocol has been identified, the string of values may be decoded into a message, e.g., the message being encoded by the string of values encoded by signal 106. Once decoded, the message may be analyzed, summarized, and/or recorded in a log. Summarizing the message may include stripping out specific data and/or simplifying a type of command or instruction. For example, a message may instruct a specific set-point change and may include a new set-point value, a source device, and a destination device. A summary of the message may indicate that the source device commanded a set-point change at destination device.

Additionally, once decoded, the message may be encoded according to another communication protocol. The other communication protocol may be, for example, a standard communication protocol, e.g., TCP/IP.

Any combination of the translated message and derivative data (including, e.g., analytic results/observations, logs, or summaries) may be stored at memory 118. The message and/or derivative data may be stored based on limited downstream connectivity of device 108. For example, the message and/or derivative data may be stored during a time period during which no device is ready to receive the message and/or derivative data at output 122. This may allow device 108 to operate in an "offline" mode. For example, device 108 may operate with limited outward connectivity (at output 122). For example, device 108 may be in a remote location with no continuous connection at output 122. In such cases, device 108 may store the message and/or derivative data in memory 118 until a portable memory 132 (e.g., a laptop or a memory drive) is connected to output 122. As another example, device 108 may connect to the other device 128 through a satellite communication link that may be available only at certain times. Device 108 may store the message and/or derivative data at memory 118 between the certain times.

Any combination of the full translated message and derivative data (including, e.g., analytic results/observations, logs, or summaries) may be provided at output 122. Output port 122 may include any number of ports. For example, output port 122 may include two, four, eight, or more ports to provide encoded messages. In some cases, the number of ports may be selected to accommodate protocols and/or the data rates of signals of the network.

Device 108 may provide the encoded message at output 122 to another device 128, e.g., for security analysis. Additionally or alternatively, device 108 may provide the "derivative data" (analytic results/observations, logs, or summaries) at output 122 to the other device 128. Device 128 may be communicatively connected to output 122 through any suitable means including a direct communicative connection, a network 130 including one or more intervening elements (including switches, routers, other computing devices, etc.), a wireless connection, or a communication involving physical transport of data media (e.g., a portable memory 132). As an example, output 122 may be configured as a virtual private network (VPN) endpoint and may communicate with the other device 128 through a VPN tunnel across a network. Device 128 may use the encoded message and/or the derivative data for alert generation, storage/recording, further security analysis, etc. For example, the derivative data may be displayed in a security operation center (SOC). Further, the derivative data may be acted upon or used as additional data for further security analysis. Further the derivative data may be used to drive prescriptive response to alerts and conditions.

Device 128 may include one or more devices or systems and may perform security analysis based on the encoded message and/or derivative data provided at output 122. Device 128 me be part of a security system or suite, e.g., an SOC. Device 128 may take actions responsive to the security analysis. For example, device 128 may issue alerts, instruct a change operating conditions of network 126, instruct a device of network 126 to cease, block, or ignore at least some communications within network 126.

In some embodiments, device 108 may be a card (e.g., a peripheral component interconnect express (PCIe) card) of device 128. In such cases, device 128 may be a PC or a workstation server. In such cases, device 108 may communicate with device 128 according to any suitable protocol, e.g., PCIe, Ethernet, or universal serial bus (USB), e.g., USB 3.0.

Figure 2:
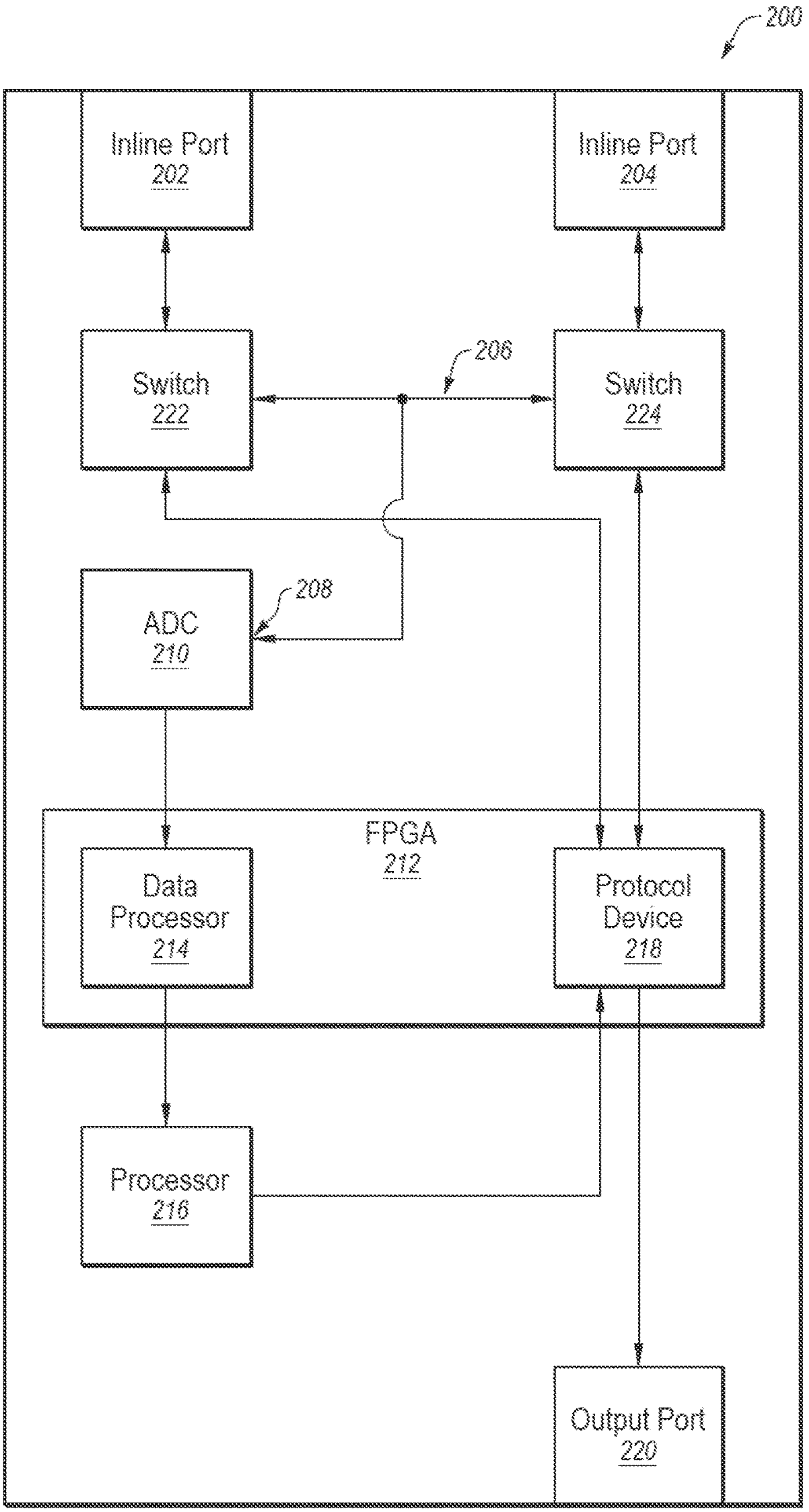
FIG. 2 is a functional block diagram illustrating an example device, according to one or more embodiments.

FIG. 2 is a functional block diagram illustrating an example device 200 according to one or more embodiments. Device 200 may be configured to observe communication. In some embodiments, device 200 may be further configured to translate the communication (e.g., communication according to an ICS protocol) into another protocol (e.g., a standard protocol). Device 200 may be an example of device 108 of FIG. 1.

In some embodiments, device 200 may include two or more inline ports (e.g., two ports) for each channel e.g., inline port 202 and inline port 204, which may be two inline ports for a single channel. In some embodiments, device 200 may be configured to receive a signal at one of inline port 202 or inline port 204 and to provide the signal to the other of inline port 202 and inline port 204 through bypass line 206. Such embodiments may receive a signal (e.g., signal 106 of FIG. 1) from a tap cable (e.g., tap cable 124 of FIG. 1). In other embodiments, device 200 may include a single port per channel that may allow for observing the signal at each channel (not illustrated in FIG. 2). Such embodiments may receive a signal (e.g., signal 106) from a diagnostic port (e.g., diagnostic port 104 of FIG. 1).

Device 200 may include ADC 210 including high-impedance input 208. ADC 210 may be configured to observe (e.g., sample) the signal at bypass line 206 through high-impedance input 208 without disrupting the signal. Alternatively, high-impedance input 208 may be electrically coupled directly to a single input per channel (e.g., as described above but not illustrated.) Thus, the signal may be observed by device 200 without being disturbed. Collectively, inline port 202, inline port 204 (or the single port), bypass line 206, and high-impedance input 208 may be an example of high-impedance input 110 of FIG. 1.

ADC 210 may be the same as, substantially similar to, or perform the same or substantially the same operations as ADC 114 of FIG. 1. For example, ADC 210 may digitize the signal.

ADC 210 may provide the digitized signal to FPGA 212. FPGA 212 (which may include one or more FPGAs) may include data processor 214. In other words, a portion of FPGA 212 may be configured to operate as data processor 214.

Data processor 214 may process the digitized signal and provide the processed digital signal to processor 216. For example, data processor 214 may be configured to receive, in real time, data about the signal as it is captured in real time by ADC 210, package, and store the data about the signal in memory or buffers to be accessed by processor 216. Data processor 214 may, in some embodiments, perform initial steps or preprocessing thereby aiding the function of processor 216. For example, data processor 214 may be configured to perform analysis of voltage levels, transition between voltage levels, and timing of transitions between voltage levels, and to communicate results to processor 216 in order to aid in the full identification and conversion of the signal.

Processor 216 may be the same as, substantially similar to, or perform the same or substantially the same operations as processor 120 of FIG. 1. For example, processor 216 may perform one or more of: compare the signal to signaling signature, identify a signaling protocol of the signal, decode the signal into a stream of values based on the signaling protocol, compare the string of values, identify a communication protocol of the string of values, decode the string of values into a message based on the communication protocol, perform security analysis (e.g., of the message), generate logs/alerts, generate summaries of the message, encode the message based on another protocol (e.g., in concert with, or through, protocol device 218), and provide any or all of the encoded message, results of the security analysis, the logs/alerts, and the summaries at output port 220 (e.g., in concert with, or through, protocol device 218).

Protocol device 218 may be configured to (under the direction of or in concert with processor 216) encode the message in a protocol (e.g., a different protocol than the communication protocol in which the message was originally encoded). As an example, protocol device 218 may include an Ethernet configured to frame the message in an Ethernet frame. Protocol device 218 may be configured to (under the direction of or in concert with processor 216) provide the encoded message to output port 220.

Via output port 220, the encoded message may be provided to another device or system, e.g., for the other device or system to perform a security analysis on the message. Output port 220 may include any number of ports. For example, output port 220 may include two, four, eight, or more ports to provide encoded messages. In some cases, the number of ports may be selected to accommodate protocols and/or the data rates of signals of the network.

In some embodiments, device 200 may include switches, e.g., switch 222 and switch 224, which may be configured to, by default, provide a signal across bypass line 206, e.g., to be observed by high-impedance input 208. Alternatively, switch 222 and switch 224 may provide the signal to protocol device 218. Device 200 may be configured to observe the signal and to determine whether the signal encodes data according to one or more predefined protocols, e.g., Gigabit Ethernet. In cases where the signal encodes data according to any one of the one or more predefined protocols, device 200 may be configured to provide the signal to protocol device 218 (i.e., instead of bypass line 206). In such cases, protocol device 218 may be configured to provide a signal received at a first port of protocol device 218 to a second port of protocol device 218, e.g., acting as a repeater. Thus, the signal is not disturbed. Further, protocol device 218 may store the signal for analysis and/or analyze the signal.

Some protocols based on, or similar to, Gigabit Ethernet (1000BASE-T, IEEE 802.3ab) may not be intercepted by an in-line connection because both endpoints send and receive data on the same wire at the same time. Some example devices (e.g., device 200), include switching circuitry (e.g., switch 222 and switch 224), may be configured to direct communication signals, by default, through the ADCs (e.g., ADC 210) and back out toward the other endpoint (e.g., output port 220). In cases where the signals encode data according to a predefined protocol (e.g., Gigabit Ethernet), the signals may be directed to a “regeneration tap” circuit (e.g., protocol device 218). For example, data processor 214, processor 216, and/or data protocol device 218 may (e.g., as part of processing the digitized signal) observe the digitized signal and determine whether the digitized signal is according to the predefined protocol. If the digitized signal is according to the predefined protocol, data processor 214, processor 216, and/or may control switch 222 and/or switch 224 to redirect the signals to the regeneration tap circuit. The regeneration tap circuit functions as a “repeater” receiving data from one port, and re-transmitting it on the other port. The switches (e.g., switch 222 and switch 224) also allow the device to be “fail safe” in that even without electrical power, signal passes through the capture device from port A to port B (or vice versa) without delay or alteration.

In some embodiments, device 200 may be a card (e.g., a PCle card) that may be installed in another system, e.g., a PC or in a workstation server. In such cases, output port 220 may communicate on a bus (e.g., a PCle data bus) of the other system. In such cases, device 200 may communicate with the other system according to any suitable protocol, e.g., PCIe, Ethernet, or USB 3.0.

Figure 3:
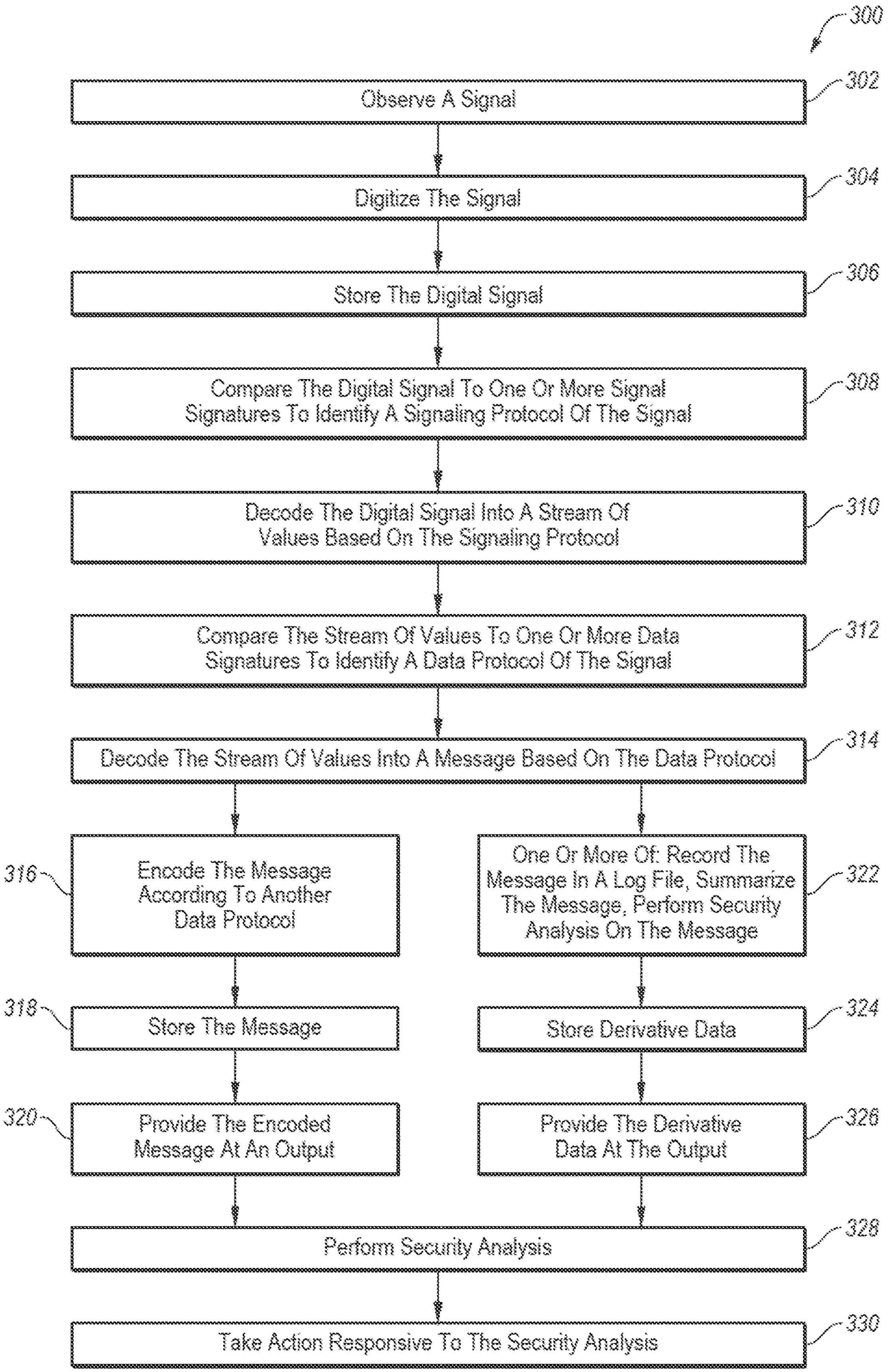
FIG. 3 is a flowchart of an example method, according to one or more embodiments.

FIG. 3 is a flowchart of an example method 300, in accordance with various embodiments of the disclosure. At least a portion of method 300 may be performed, in some embodiments, by a device or system, such as device 108 of FIG. 1, device 200 of FIG. 2, capture device 406 of FIG. 4, capture device 408 of FIG. 4, analysis device 410 of FIG. 4, device 600 of FIG. 6, or another device or system. Although illustrated as discrete blocks, various blocks may be divided into additional blocks, combined into fewer blocks, or eliminated, depending on the desired implementation.

At block 302, a signal may be observed. In some embodiments, the signal may be observed without disrupting the signal. As an example, signal 106 of FIG. 1 may be observed at high-impedance input 110 of FIG. 1. As another example, a signal may be observed at high-impedance input 208 of FIG. 2.

At block 304, the signal may be digitized. As an example, signal 112 of FIG. 1 may be digitized into digital signal 116 of FIG. 1 by ADC 114 of FIG. 1. As another example, a signal may be digitized by ADC 210 of FIG. 2.

At block 306, the digital signal may be stored. As an example, digital signal 116 may be stored at memory 118 of FIG. 1.

At block 308, the digital signal may be compared to one or more signal signatures to identify a signaling protocol of the signal. As an example, digital signal 116 may be compared by processor 120 of FIG. 1 to signal signatures stored at memory 118. As another example, a digital signal may be compared by processor 216 of FIG. 2 to signal signatures.

At block 310, the signal may be decoded into a stream of values based on the identified signaling protocol. As an example, processor 120 may decode digital signal 116 into the stream of values. As another example, processor 216 may decode a signal into the stream of values.

At block 312, the stream of values may be compared to one or more communication signatures to identify a communication protocol of the stream of values. As an example, processor 120 may compare a stream of values to communication signatures stored at memory 118. As another example, processor 216 may compare a stream of values to communication signatures.

At block 314, the stream of values may be decoded into a message based on the identified communication protocol. As an example, processor 120 may decode a stream of values into a message. As another example, processor 216 may decode a stream of values into a message.

At block 316, the message may be encoded according to another communication protocol. As an example, processor 120 may encode a message according to another communication protocol. As another example, processor 216 or protocol device 218 of FIG. 2 may encode a message according to another communication protocol.

At block 318, the message may be stored. The message may be stored, for example, if the device that decoded the stream of values into the message (e.g., at block 314) has limited downstream connectivity. For example, the message may be stored until the message may be provided to a device at an output. The message may be stored according to any suitable protocol, e.g., the identified communication protocol of the message, the other communication protocol into which the message was encoded (e.g., at block 316), or another protocol. As an example, the message may be stored at memory 118 of FIG. 1. The message may be stored until a device can receive the message from output 122.

At block 320, the encoded message may be provided at an output. As an example, processor 120 may provide an encoded message at output 122 of FIG. 1. As another example, processor 216 or protocol device 218 may provide an encoded message at output port 220.

At block 322, which may occur in parallel with, or as an alternative to, any or all of block 316, block 318, and block 320, the message may be recorded (e.g., in a log file), the message may be summarized, and/or a security analysis may be performed on the message. As an example, processor 120 may record the message in a log file, e.g., in memory 118, processor 120 may summarize the message, and/or processor 120 may perform the security analysis on the message. As another example, processor 216 may record the message in a log file, summarize the message, and/or perform the security analysis on the message.

At block 324, which may occur in parallel with, or as an alternative to, any or all of block 316, block 318, and block 320, derivative data may be stored. The derivative data may include, analytic results, logs, and/or summaries, e.g., the analytical results, logs, and/or summaries of block 322. Similar to block 320, the derivative data may be stored in case of limited downstream connectivity. As an example, the derivative data may be stored at memory 118.

At block 326, which may occur in parallel with, or as an alternative to, any or all of block 316, block 318, and block 320, the derivative data may be provided to an output (e.g., the same output to which the encoded message was provided at block 320). As an example, the derivative data may be provided at output 122. As another example, the derivative data may be provided at output port 220.

In some embodiments, after the encoded message and/or the derivative data has been provided at the output, (e.g., at block 320 and/or block 326), the encoded message or derivative data may be received by another device, series or group of devices, or system for further analysis and/or action. For example, device 128 of FIG. 1 may receive the encoded message and/or the derivative data.

At block 328, security analysis may be performed. The security analysis may be performed on the encoded message and/or based on the derivative data. In some embodiments, the security analysis may be performed by a device, group of devices, or system that is separate from a device or system that performs one or more of the operations described with relation to blocks 302 through 326. For example, device 128 may perform the security analysis.

At block 330, an action may be taken responsive to security analysis of the encoded message and/or the derivative data. For example, alerts may be issued, changes in operating conditions of a network may be made, at least some communications within the network may be ceased, blocked, and/or ignored.

Figure 4:
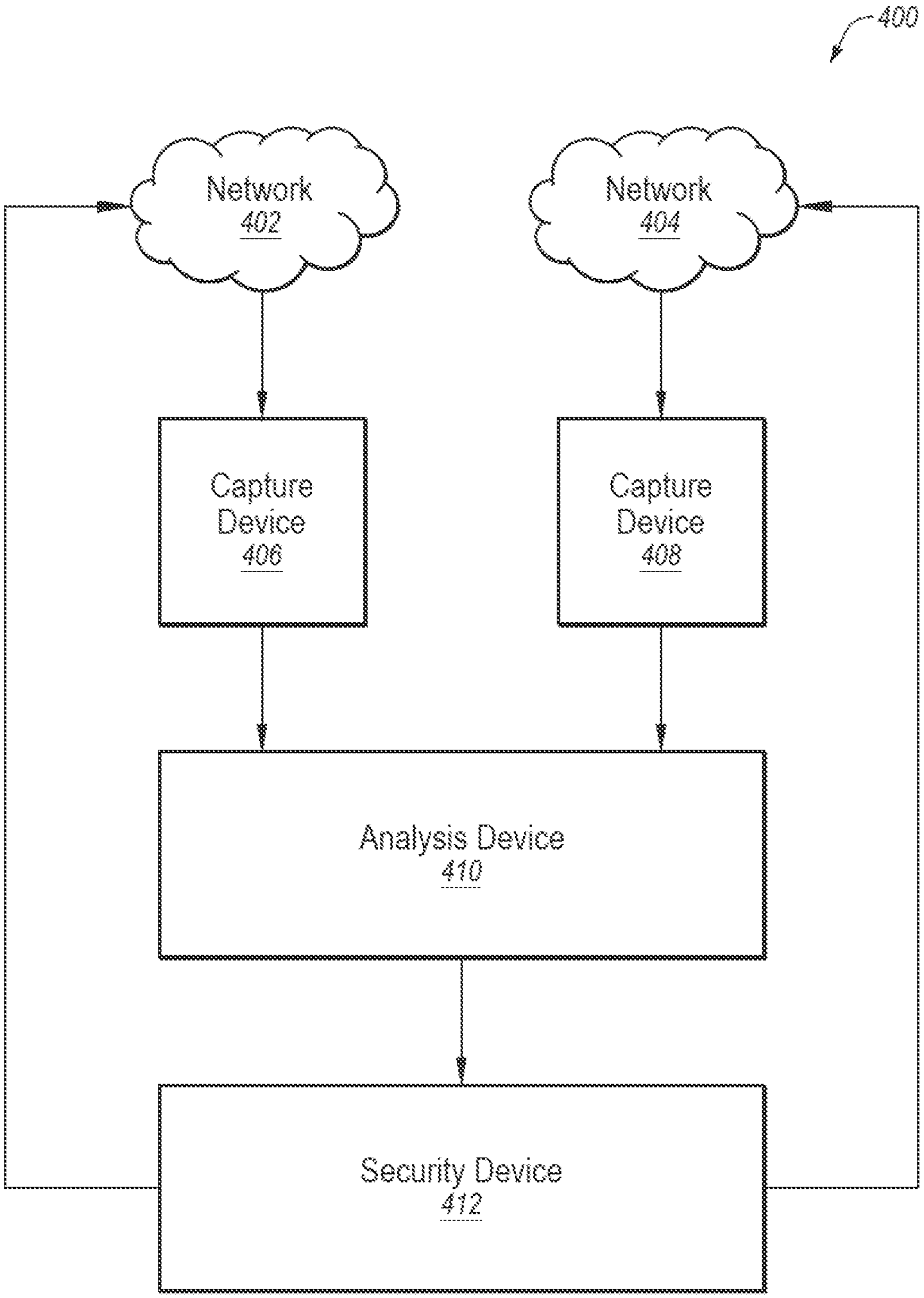
FIG. 4 is a functional block diagram illustrating an example system, according to one or more embodiments.

FIG. 4 is a functional block diagram illustrating an example system 400 according to one or more embodiments. System 400 includes capture device 406, capture device 408, and analysis device 410. Capture device 406 may observe communication in network 402. Capture device 408 may observe communication in network 404. Analysis device 410 may decode communications (e.g., communications observed by capture device 406 and/or capture device 408) (which may be communications according to an ICS protocol) and may encode the communications in another protocol (e.g., a standard protocol). Additionally or alternatively, analysis device 410 may analyze the communications and/or generate derivative data based on the communications. Analysis device 410 may provide the encoded communications and/or the derivative data to security device 412.

Each of capture device 406 and capture device 408 may perform some of the operations described above with regard to device 108 of FIG. 1 and/or device 200 of FIG. 2. For example, each of capture device 406 and capture device 408 may be coupled to a respective network (i.e., network 402 and network 404) and may observe communications within the respective network. Each of capture device 406 and capture device 408 may include a high-impedance input (e.g., analogous to high-impedance input 110 of FIG. 1 and/or high-impedance input 208 of FIG. 2) and an ADC (e.g., analogous to ADC 114 of FIG. 1 and/or ADC 210 of FIG. 2). Alternatively, one or both of capture device 406 and capture device 408 may include switching circuitry (e.g., switch 222 of FIG. 2 and switch 224 of FIG. 2), which switching circuitry may be configured to direct communication signals, by default, through ADCs (e.g., ADC 210 of FIG. 2) and back out toward the other endpoint (e.g., output port 220 of FIG. 2), or may be configured to direct communication signals to another circuit constituting a regeneration tap (e.g., protocol device 218 of FIG. 2) or other means whereby the signal can be digitized. In some embodiments, capture device 406 and capture device 408 may observe the communications in some other way, e.g., not including a high-impedance input nor regeneration tap. For example, capture device 406 and capture device 408 may be realized as a protocol-converter device, a diagnostic tool, an oscilloscope, a software-defined radio, or any other means of providing digitized communication signals to analysis device 410.

Each of capture device 406 and capture device 408 may perform some of the operations described above with regard to method 300 of FIG. 3. In particular, each of capture device 406 and capture device 408 may perform operations of block 302, block 304, and/or block 306. Alternatively, rather than storing the digital signal at a memory, as described with regard to block 306, the digital signal, or a representation of the digital signal may be provided to analysis device 410. Analysis device 410 (or analysis device 410 in conjunction with capture device 406 and/or capture device 408) may perform some of the operations described above with regard to method 300 of FIG. 3. In particular, analysis device 410 (or analysis device 410 in conjunction with capture device 406 and/or capture device 408) may perform operations of block 308, block 310, block 312, block 314, block 316 and/or block 322. Analysis device 410 may perform some of the operations described above with regard to method 300 of FIG. 3. In particular, analysis device 410 may perform operations of block 318, block 320, block 324 and/or block 326. Security device 412 may perform some of the operations described above with regard to method 300 of FIG. 3. In particular, security device 412 may perform operations of block 328 and/or block 330.

Analysis device 410 may perform some of the operations described above with regard to device 108 of FIG. 1 and/or device 200 of FIG. 2. For example, analysis device 410 may analyze a representation of a digital signal, e.g., received from capture device 406 and/or capture device 408. The analysis may include identifying a signaling protocol of the signal, decoding the signal into a string of values according to the signaling protocol, identifying a data protocol of the string of values, and decoding the string of values into a message. Thus, analysis device may perform operations the same as, or similar to, those described above with regard to memory 118 of FIG. 1 and processor 120 of FIG. 1 and/or FPGA 212 of FIG. 2, data processor 214 of FIG. 2, processor 216 of FIG. 2, and protocol device 218 of FIG. 2.

Analysis device 410 may perform some of the operations described above with regard to method 300. For example, analysis device 410 may perform operations of one or more of block 308, block 310, block 312, block 314, block 316, block 318, block 320, block 322, block 324, block 326, and block 328.

Analysis device 410 may provide an encoded message (e.g., according to the standard protocol) and/or derivative data to security device 412. Security device 412 may perform operations as described above with regard to device 128 of FIG. 1 and/or to block 330 of FIG. 3.

Security device 412 may be another device, e.g., on the same network with analysis device 410. Additionally or alternatively, security device 412 may be an application or virtual instance onboard the same physical PC/Server as analysis device 410.

In FIG. 4, two networks (network 402 and network 404) and two corresponding capture devices (capture device 406 and capture device 408) are illustrated for descriptive purposes. Other systems may include any number of networks and respective capture devices. For example, analysis device 410 may be capable of analyzing representations of digital signals from any number of networks.

In some embodiments, capture device 406 and/or capture device 408 may be devices within network 402 and/or network 404 respectively. In such cases capture device 406 and/or capture device 408 may repeat communications of network 402 and network 404 respectively to analysis device 410. In other embodiments, capture device 406 and/or capture device 408 may be standalone devices capturing signals within network 402 and/or network 404 respectively and providing the captured signals to analysis device 410. In other embodiments, capture device 406 and/or capture device 408 may be part of analysis device 410.

In some embodiments, analysis device 410 may be a device including one or more capture devices (e.g., capture device 406 and capture device 408). In other embodiments, network analyzer may be a standalone device for receiving representations of digital signals (e.g., repeated or captured digital signals) and for analyzing the digital signals. In some embodiments, analysis device 410 may be coupled to a device of one or more networks (e.g., network 402 and/or network 404). In some embodiments, analysis device may be any suitable device (e.g., a processor of a PC or a processor of a workstation server) running code that causes the device to perform the operations described herein.

In some embodiments, one or both of capture device 406 and capture device 408 may be, or may be included in, a card, e.g., a PCIe card of a system. In such cases, analysis device 410 may be the system. For example, analysis device 410 may be a PC or a workstation server and one or both of capture device 406 and capture device 408 may be cards therein. In such cases, capture device 406 and/or capture device 408 may communicate with analysis device 410 according to any suitable protocol, e.g., PCIe, Ethernet, or USB 3.0.

Figure 5:
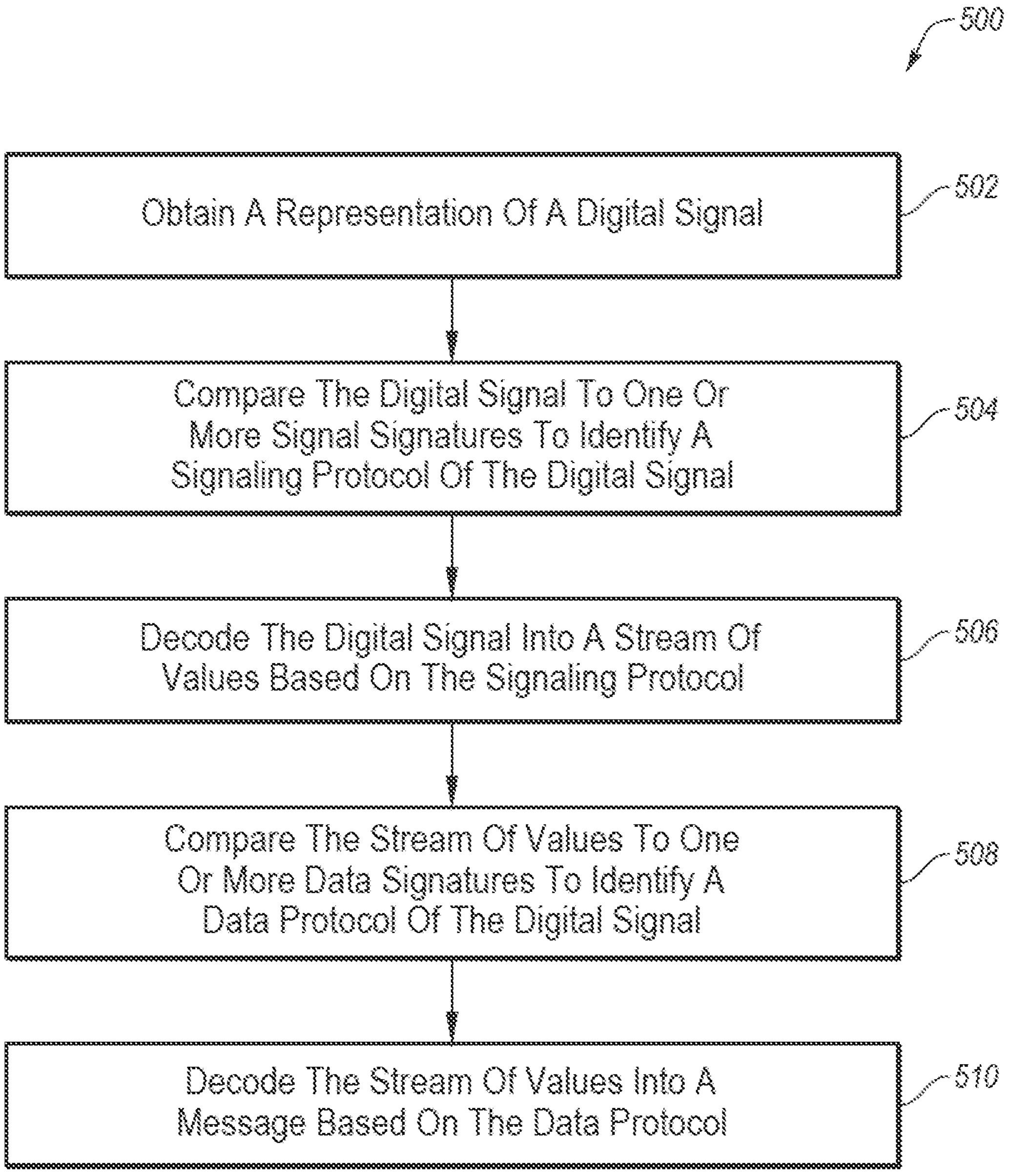
FIG. 5 is a flowchart of an example method, in accordance with various embodiments of the disclosure.

FIG. 5 is a flowchart of an example method 500, in accordance with various embodiments of the disclosure. At least a portion of method 500 may be performed, in some embodiments, by a device or system, such as device 108 of FIG. 1, processor 120 of FIG. 1, device 200 of FIG. 2, processor 216 of FIG. 2, analysis device 410 of FIG. 4, device 600 of FIG. 6, or another device or system. Although illustrated as discrete blocks, various blocks may be divided into additional blocks, combined into fewer blocks, or eliminated, depending on the desired implementation.

At block 502, a representation of a digital signal may be obtained. For example, device 108 of FIG. 1 may obtain digital signal 116 of FIG. 1 using high-impedance input 110 of FIG. 1 and ADC 114 of FIG. 1. As another example, device 200 of FIG. 2 may obtain a digital signal using inline port 202 of FIG. 2, inline port 204 of FIG. 2, high-impedance input 208 of FIG. 2 and/or ADC 210 of FIG. 2. As another example, capture device 406 of FIG. 4 or capture device 408 of FIG. 4 may obtain a digital signal. Alternatively, block 502 may be performed in some other way, e.g., not including a high-impedance input. For example, a trace representing the digitized signal may be obtained from an oscilloscope, recorded data may be obtained from a network/device diagnostic tool, or recorded data may be obtained from a wireless device, e.g., a software defined radio.

At block 504, the digital signal may be compared to one or more signal signatures to identify a signaling protocol of the digital signal. Block 504 may be the same as, or substantially similar to block 308 of FIG. 3.

At block 506, the digital signal may be decoded into a stream of values based on the signaling protocol. Block 506 may be the same as, or substantially similar to block 310 of FIG. 3.

At block 508, the stream of values may be compared to one or more data signatures to identify a data protocol of the digital signal. Block 508 may be the same as, or substantially similar to block 312 of FIG. 3.

At block 510, the stream of values may be decoded into a message based on the data protocol. Block 510 may be the same as, or substantially similar to block 314 of FIG. 3.

Modifications, additions, or omissions may be made to method 300 of FIG. 3 and/or method 500 of FIG. 5 without departing from the scope of the present disclosure. For example, the operations of method 300 and/or method 500 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 6:
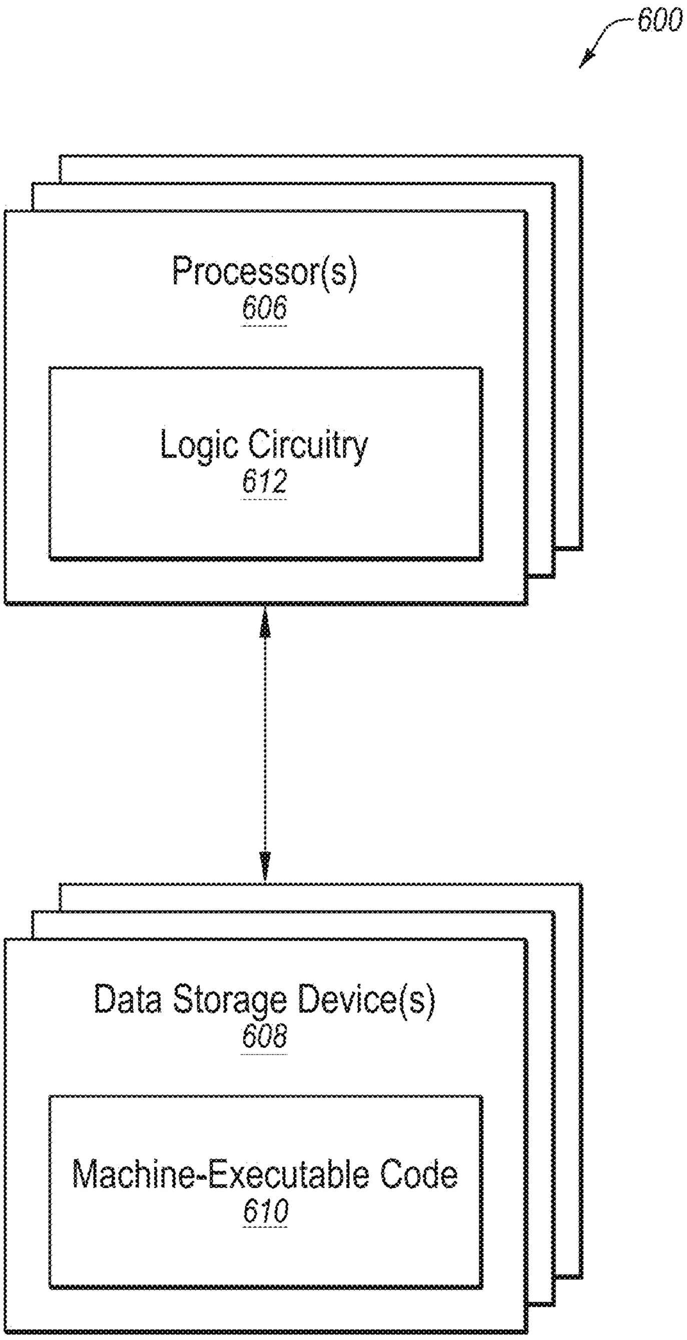
FIG. 6 is a block diagram of a device that, in one or more examples, may be used to implement various functions, operations, acts, processes, or methods disclosed herein.

FIG. 6 is a block diagram of a device 600 that, in one or more examples, may be used to implement various functions, operations, acts, processes, or methods disclosed herein. Device 600 includes one or more processors 606 (sometimes referred to herein as "processors 606") operably coupled to one or more apparatuses such as data storage devices (sometimes referred to herein as "storage 608"), without limitation. Storage 608 includes machine-executable code 610 stored thereon (e.g., stored on a computer-readable memory, without limitation) and processors 606 include logic circuitry 612. Machine-executable code 610 may include information describing functional elements that may be implemented by (e.g., performed by) logic circuitry 612. Logic circuitry 612 may implement (e.g., perform) the functional elements described by machine-executable code 610. Device 600, when executing the functional elements described by machine-executable code 610, should be considered as special purpose hardware and may carry out the functional elements disclosed herein. In one or more examples, processors 606 may perform the functional elements described by machine-executable code 610 sequentially, concurrently (e.g., on one or more different hardware platforms), or in one or more parallel process streams.

When implemented by logic circuitry 612 of processors 606, machine-executable code 610 may adapt processors 606 to perform operations of examples disclosed herein. For example, machine-executable code 610 may adapt processors 606 to perform at least a portion or a totality of method 300 of FIG. 3 or 500 of FIG. 5. As another example, machine-executable code 610 may adapt processors 606 to perform at least a portion or a totality of the operations discussed for device 108 of FIG. 1, processor 120 of FIG. 1, device 200 of FIG. 2, FPGA 212 of FIG. 2, data processor 214 of FIG. 2, processor 216 of FIG. 2, protocol device 218 of FIG. 2, method 300 of FIG. 3, capture device 406 of FIG. 4, capture device 408 of FIG. 4, and/or analysis device 410 of FIG. 4.

Processors 606 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 606 may include any conventional processor, controller, microcontroller, or state machine. Processors 606 may also be implemented as a combination of computing devices, such as a combination of a DSP and a microprocessor, a plurality of microprocessors, one or more microprocessors in conjunction with a DSP core, or any other such configuration.

In one or more examples, storage 608 includes volatile data storage (e.g., random-access memory (RAM), without limitation), non-volatile data storage (e.g., Flash memory, a hard disc drive, a solid-state drive, erasable programmable read-only memory (EPROM), without limitation). In one or more examples, processors 606 and storage 608 may be implemented into a single device (e.g., a semiconductor device product, a system on chip (SOC), without limitation). In one or more examples, processors 606 and storage 608 may be implemented into separate devices.

In one or more examples, machine-executable code 610 may include computer-readable instructions (e.g., software code, firmware code, without limitation). By way of non-limiting example, the computer-readable instructions may be stored by storage 608, accessed directly by processors 606, and executed by processors 606 using at least logic circuitry 612. Also by way of non-limiting example, the computer-readable instructions may be stored on storage 608, transmitted to a memory device (not shown) for execution, and executed by processors 606 using at least logic circuitry 612. Accordingly, in one or more examples, logic circuitry 612 includes electrically configurable logic circuitry.

In one or more examples, machine-executable code 610 may describe hardware (e.g., circuitry, without limitation) to be implemented in logic circuitry 612 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, VERILOG™, SYSTEMVERILOG™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 612 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples, machine-executable code 610 may include an HDL, an RTL, a GL description, a mask level description, other hardware description, or any combination thereof.

In examples where machine-executable code 610 includes a hardware description (at any level of abstraction), a system (not shown, but including storage 608) may implement the hardware description described by machine-executable code 610. By way of non-limiting example, processors 606 may include a programmable logic device (e.g., an FPGA or a PLC, without limitation) and the logic circuitry 612 may be electrically controlled to implement circuitry corresponding to the hardware description into logic circuitry 612. Also, by way of non-limiting example, logic circuitry 612 may include hard-wired logic manufactured by a manufacturing system (not shown, but including storage 608) according to the hardware description of machine-executable code 610.

Regardless of whether machine-executable code 610 includes computer-readable instructions or a hardware description, logic circuitry 612 performs the functional elements described by machine-executable code 610 when implementing the functional elements of machine-executable code 610. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to some embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A device comprising:
- a high-impedance input configured to observe a signal;
- an analog-to-digital converter configured to digitize the signal; and
- a memory configured to store the digital signal,
- wherein the high-impedance input has a floating reference configured to adapt to a ground potential of the signal to enable observation of the signal without disrupting the signal.

2. The device of claim 1, wherein the high-impedance input exhibits greater than 1 kilovolt of isolation.

3. The device of claim 1, wherein the high-impedance input comprises two high-impedance inputs for observing a differential signal.

4. The device of claim 1, further comprising two or more high-impedance inputs configured to measure the signal at two or more corresponding channels.

5. The device of claim 1, wherein the floating reference is configured to adapt to the ground potential of the signal to maintain the signal within an input range of the analog-to-digital converter.

6. The device of claim 1, wherein the device is configured to receive, via the high-impedance input, the signal from a diagnostic port of another device configured to operate in a network, the signal being a copy of a signal received by, or transmitted by, the other device in the network.

7. The device of claim 1, wherein the device further comprises a processor configured to analyze the stored digital signal while the digital signal is being stored.

8. The device of claim 1, further comprising a processor configured to:
- compare the stored digital signal to one or more signal signatures to identify a signaling protocol of the signal; and
- decode the stored digital signal into a stream of values based on the signaling protocol.

9. The device of claim 8, wherein the processor is further configured to:
- compare the stream of values to one or more communication signatures to identify a communication protocol of the signal; and
- decode the stream of values into a message based on the communication protocol.

10. The device of claim 9, wherein the communication protocol comprises a first communication protocol, wherein the processor is further configured to:

encode the message according to a second communication protocol; and provide the encoded message at an output of the device.

11. The device of claim 9, wherein the processor is further configured to one or more of:

store the message at a memory of the device;

summarize the message;

store a summary of the message at the memory;

provide the summary at an output of the device;

perform security analysis on the message;

store results of the security analysis at the memory; and provide the results at the output.

12. The device of claim 1, further comprising:

a regeneration-tap circuit; and switches to redirect the signal away from the high-impedance input to the regeneration-tap circuit in response to a determination that the signal is according to a predetermined protocol.

13. A method comprising:

comparing characteristics of a signal to corresponding characteristics of signal signatures associated with multiple signaling protocols to identify a signaling protocol of the signal from among the multiple signaling protocols; and decoding the signal into a stream of values based on the identified signaling protocol, decoding the signal into a stream of values based on the identified signaling protocol, wherein the corresponding characteristics of the signal signatures associated with the multiple signaling protocols comprise a plurality of: a peak-to-peak voltage range, a count of voltage levels, voltages of voltage levels, a count of transitions between voltage levels, transition times, an idle-state voltage, a type of the signal, a number of channels, and a timing synchronization.

14. The method of claim 13, further comprising:

observing the signal without disrupting the signal.

15. The method of claim 14, wherein observing the signal comprises measuring voltage changes of the signal without altering the voltage changes by more than 10%.

16. The method of claim 13, further comprising: observing the signal on a number of channels.

17. The method of claim 13, further comprising:

comparing the stream of values to one or more communication signatures to identify a communication protocol of the stream of values; and decoding the stream of values into a message based on the communication protocol.

18. The method of claim 17, wherein comparing the stream of values to the one or more communication signatures comprises comparing characteristics of the stream of values to corresponding characteristics of communication signatures associated with multiple communication protocols to identify the communication protocol of the signal from among the multiple communication protocols, the corresponding characteristics of the communication signatures associated with multiple communication protocols comprising a plurality of: header sizes, header content, a data format, payload sizes, function codes, error-check codes, and priority information.

19. The method of claim 17, wherein the communication protocol comprises a first communication protocol, the method further comprising encoding the message according to a second communication protocol.

20. The method of claim 19, wherein encoding the message according to the second communication protocol comprises packetizing the message in an Ethernet packet.

21. The method of claim 19, further comprising providing the encoded message at an output.

22. The method of claim 21, further comprising performing security analysis on the encoded message.

23. The method of claim 17, further comprising one or more of:

storing the message;

summarizing the message;

storing a summary of the message;

providing the summary at an output;

performing security analysis on the message;

storing results of the security analysis; and providing the results at the output.

24. A device comprising:

a high-impedance input configured to observe a signal without disrupting the signal;

an analog-to-digital converter configured to digitize the signal;

a memory configured to store the digital signal; and a processor configured to:

compare the stored digital signal to one or more signal signatures to identify a signaling protocol of the signal; and decode the stored digital signal into a stream of values based on the signaling protocol.

25. The device of claim 24, wherein the high-impedance input exhibits greater than 1 kilovolt of isolation.

26. The device of claim 24, wherein the high-impedance input has a floating reference configured to adapt to a ground potential of the signal to enable observation of the signal without disrupting the signal.

27. The device of claim 24, wherein the device is configured to receive, via the high-impedance input, the signal from a diagnostic port of another device configured to operate in a network, the signal being a copy of a signal received by, or transmitted by, the other device in the network.

28. A device comprising:

a processor configured to:

compare a signal to one or more signal signatures to identify a signaling protocol of the signal;

decode the signal into a stream of values based on the signaling protocol;

compare the stream of values to one or more communication signatures to identify a communication protocol of the signal; and decode the stream of values into a message based on the communication protocol.

29. The device of claim 28, wherein the processor is configured to compare the signal to the one or more signal signatures by comparing characteristics of the signal to corresponding characteristics of signal signatures associated with multiple signaling protocols to identify the signaling protocol of the signal from among the multiple signaling protocols, the corresponding characteristics of the signal signatures comprising a number of: a peak-to-peak voltage range, a count of voltage levels, voltages of voltage levels, a count of transitions between voltage levels, transition times, an idle-state voltage, a type of the signal, a number of channels, and a timing synchronization.

30. The device of claim 28, wherein the processor is configured to compare the stream of values to the one or more communication signatures by comparing characteristics of the stream of values to corresponding characteristics of communication signatures associated with multiple communication protocols to identify the communication protocol of the signal from among the multiple communication protocols, the corresponding characteristics of the communication signatures comprising a number of: header sizes, header content, a data format, payload sizes, function codes, error-check codes, and priority information.

* * * * *